US006678354B1

United States Patent
Blue (10) Patent No.: US 6,678,354 B1
(45) Date of Patent: Jan. 13, 2004

(54) SYSTEM AND METHOD FOR DETERMINING NUMBER OF VOICE PROCESSING ENGINES CAPABLE OF SUPPORT ON A DATA PROCESSING SYSTEM

(75) Inventor: Reginald V. Blue, Potomac Falls, VA (US)

(73) Assignee: Unisys Corporation, Blue Bell, PA (US)

( * ) Notice: Subject to any disclaimer, the term of this patent is extended or adjusted under 35 U.S.C. 154(b) by 182 days.

(21) Appl. No.: 09/736,606

(22) Filed: Dec. 14, 2000

(51) Int. Cl.$^7$ .......................... H04M 1/24; H04M 3/08; H04M 3/22
(52) U.S. Cl. ................ 379/10.01; 379/1.02; 379/15.01
(58) Field of Search .................. 379/1.02, 9.04, 379/10.01, 10.03, 22.02, 27.04, 29.01, 29.02, 15.01; 704/260, 270, 275, 277; 702/108, 117, 118, 120, 125, 126

(56) References Cited

U.S. PATENT DOCUMENTS

| | | | | |
|---|---|---|---|---|
| 4,315,330 A | * | 2/1982 | Brickman et al. | 370/104 |
| 4,799,261 A | * | 1/1989 | Lin et al. | 704/219 |
| 5,572,570 A | * | 11/1996 | Kuenzig | 379/1.02 |
| 5,633,909 A | * | 5/1997 | Fitch | 379/15 |
| 5,729,694 A | * | 3/1998 | Holzrichter et al. | 395/2.17 |
| 5,822,397 A | * | 10/1998 | Newman | 379/27.02 |
| 5,850,629 A | * | 12/1998 | Holm et al. | 704/260 |
| 5,896,442 A | * | 4/1999 | Song et al. | 379/88.07 |
| 5,933,475 A | * | 8/1999 | Coleman | 379/1 |
| 5,940,472 A | * | 8/1999 | Newman et al. | 379/10.02 |
| 5,966,691 A | * | 10/1999 | Kibre et al. | 704/260 |
| 6,141,642 A | * | 10/2000 | Oh | 704/260 |
| 6,192,108 B1 | * | 2/2001 | Mumford et al. | 379/9 |
| 6,269,336 B1 | * | 7/2001 | Ladd et al. | 704/270 |
| 6,304,634 B1 | * | 10/2001 | Hollier et al. | 379/22.02 |
| 6,466,909 B1 | * | 10/2002 | Didcock | 704/260 |

* cited by examiner

Primary Examiner—Binh Tieu
(74) Attorney, Agent, or Firm—Michael B. Atlass; Mark T. Starr; Woodcock Washburn LLP (57) ABSTRACT

A test application allows configuration of test parameters and launches a voice processing engine and a timing object. The voice processing engine outputs data to the timing object. The timing object receives data, regularly removes data, and tracks the amount of data remaining in the timing object. The timing object reports an underflow if there is no data in the timing object and the voice processing engine has not signaled end of processing.

62 Claims, 6 Drawing Sheets

SYSTEM AND METHOD FOR DETERMINING NUMBER OF VOICE PROCESSING ENGINES CAPABLE OF SUPPORT ON A DATA PROCESSING SYSTEM

FIELD OF THE INVENTION

The present invention generally relates to the field of performance testing of processor bound voice processing engines. More particularly, the present invention relates to detecting underflow conditions to determine the number of voice processing engines capable of being supported by a data processing system.

BACKGROUND OF THE INVENTION

Messaging systems often provide voice processing capabilities that are utilized to both process and simulate human speech. One example of such a messaging system is the Network Applications Platform (NAP) commercially available from UNISYS Corporation ("the NAP system"). The NAP is a configuration of hardware and software that provides data and voice processing capabilities through applications running on a host computer system. The NAP, in combination with a network interface unit (NIU), provides the interface between these applications, called network applications, and a telephone network. The NAP is implemented on selected Unisys A Series and ClearPath HMP NX computer systems running the Unisys MCP operating system. Further details of the structure and function of the NAP are provided in the following issued patents and pending applications, all of which are hereby incorporated by reference in their entireties:

U.S. Pat. No. 5,133,004, issued Jul. 21, 1992, entitled "Digital Computer Platform for Supporting Telephone Network Applications";

U.S. Pat. No. 5,323,450, issued Jun. 21, 1994, entitled "Telephone Network Applications Platform for Supporting Facsimile Applications";

U.S. Pat. No. 5,384,829, issued Jan. 24, 1995, entitled "Digital Computer Platform for Supporting Telephone Network Applications";

U.S. Pat. No. 5,493,606, issued Feb. 20, 1996, entitled "Multi-Lingual Prompt Management System for a Network Applications Platform";

U.S. Pat. No. 6,058,166, issued May 2, 2000 entitled "Enhanced Multi-Lingual Prompt Management in a Voice Messaging System With Support for Speech Recognition";

U.S. patent application Ser. No. 09/161,214, filed Sep. 25, 1998, entitled "Multiple Node Messaging System Wherein Nodes Have Shared Access To Message Stores Of Other Nodes";

U.S. patent application Ser. No. 09/307,014, filed May 7, 1999, entitled "Inter-System Call Transfer";

U.S. patent application Ser. No. 09/451,077, filed Nov. 30, 1999, entitled "Method and Apparatus for Preventing Hung Calls During Protocol Violations in a Voice Messaging System";

U.S. patent application Ser. No. 09/636,656, filed Aug. 11, 2000, entitled "Network Interface Unit Having an Embedded Services Processor"; and U.S. patent application Ser. No. 09/636,677, filed Aug. 11, 2000, entitled "Adjunct Processing Of Multi-Media Functions In A Universal Messaging System"

In providing voice messaging systems, it is sometimes necessary to provide a scalable system that offers a multitude of voice processing engines, such as Text to Speech (TTS) engines, Automated Speech Recognition (ASR) engines, or Natural Language Understanding (NLU) engines, running concurrently to service the needs of multiple simultaneous human users. However, voice processing engines are processor bound and, thus, only a limited number can run on a particular data processing system with a particular configuration. If the operation of the data processing system is real time, (i.e., it is handing audio to a person instead of saving it, for example, to a file) the processing of voice information (e.g., voice generation or voice recognition) is critical. For example, in the case of TTS processing, if the data processing system does not generate speech in a timely fashion, as judged from the perspective of the human user, a condition occurs called an underflow. To the human user listening to the audio, underflow will sound like breaks in the audio and generally results in an unpleasant listening experience.

Determining the number of voice processing engines that can run on a particular data processing system can be problematic. Such testing normally requires expensive hardware, such as telephony hardware to discern an approximate number by simulating a number of human users connected to the system. This method is expensive and time consuming. Furthermore, using telephony hardware means that one must provide some kind of stimulus to start the system.

In the simplest case, a number of callers dial into the messaging system and simultaneously launch a voice processing engine. This method is difficult to coordinate and synchronize and is not conducive to running multiple tests. Alternatively, one could use a system that automatically dials in to the messaging system and launches a voice processing engine. However, such an automatic system would likely be even worse at detecting underflow conditions than would a human. For example, if the voice processing engine is a TTS engine, the engine inputs text data and outputs speech data in an audio format. The automatic system would analyze the audio and determine if an underflow condition has occurred. Very minor underflows would likely not be detected because it would have only a minor impact on the audio output. Also, the criteria for judging the underflow experience will be subjective rather than an objective measurement of the system's capabilities.

In view of the above problems, there is a recognized need for a system and method which can objectively discern the number of voice processing engines that can be run simultaneously on a particular data processing system without the installation of expensive hardware. The present invention satisfies this need.

SUMMARY OF THE PRESENT INVENTION

This invention is directed to systems and methods for determining how many voice processing engines (e.g., Text to Speech (TTS) engines, Automated Speech Recognition (ASR) engines, or Natural Language Understanding (NLU) engines), a particular data processing system, or computer system can run without causing underflow conditions.

For example, in the context of TTS processing, a computer system may run one or more TTS engines to provide voice synthesis. Text data is input to a TTS engine, and the engine converts the text formatted data to speech formatted data and outputs that speech data to an audio object, for example, for playing the speech over speakers. If the TTS engine does not perform its conversion quickly enough, there will not be enough speech data for the audio object to process, which is considered an underflow condition. The speech will include breaks in the speech and potentially become unrecognizable. The present invention can be used in this context to determine how many TTS engine instances a particular computer system can run without causing audio underflows.

An embodiment of the present invention includes three components: a test application for configuring test parameters, launching voice processing engines, and monitoring results; at least one voice processing engine under test; and a timing object (rather than, for example, an audio object used in TTS processing).

The test application allows the user to configure test parameters, such as selecting a particular voice processing engine to be tested and a maximum buffer size for the timing object. The test application then launches a voice processing engine (e.g., a TTS engine). The engine then processes input data, performs a conversion of the data to a different format, and outputs the converted data to the timing object. For example, if the voice processing engine is a TTS engine, the engine receives text data (e.g., the text string "testing, one, two, three"), processes the text data into speech data, and outputs the speech data to the timing object.

The timing object simulates a real audio object and tracks an amount of data remaining in the timing object. Preferably, the timing object includes a counter to track the amount of data remaining in the timing object. Alternatively, the timing object may include a buffer to track the amount of data remaining in the timing object.

The timing object regularly receives data from a voice processing engine. The timing object also simulates a regular extraction of a specified amount of data from the timing object. The counter or the buffer of the timing object is used to track the amount of data remaining in the timing object as data is received from the voice processing engine and "removed" at regular intervals by the timing object. If the timing object tries to remove more data than remains in the timing object, it reports an underflow, unless the voice processing engine has signaled that it has completed processing the data.

With this system, the test application can successively launch multiple voice processing engines until an underflow condition is detected, which determines the capacity of the data processing system to handle multiple voice processing engines.

BRIEF DESCRIPTION OF THE DRAWINGS

The present invention is further described in the detailed description that follows, by reference to the noted plurality of drawings by way of non-limiting examples of embodiments of the present invention, in which like references numerals represent similar parts throughout the several views of the drawings, and wherein.

DETAILED DESCRIPTION OF THE PREFERRED EMBODIMENTS

The present invention is directed to systems and methods for determining the number of voice processing engines capable of being supported by a data processing system.

Voice Messaging System

Figure 1:
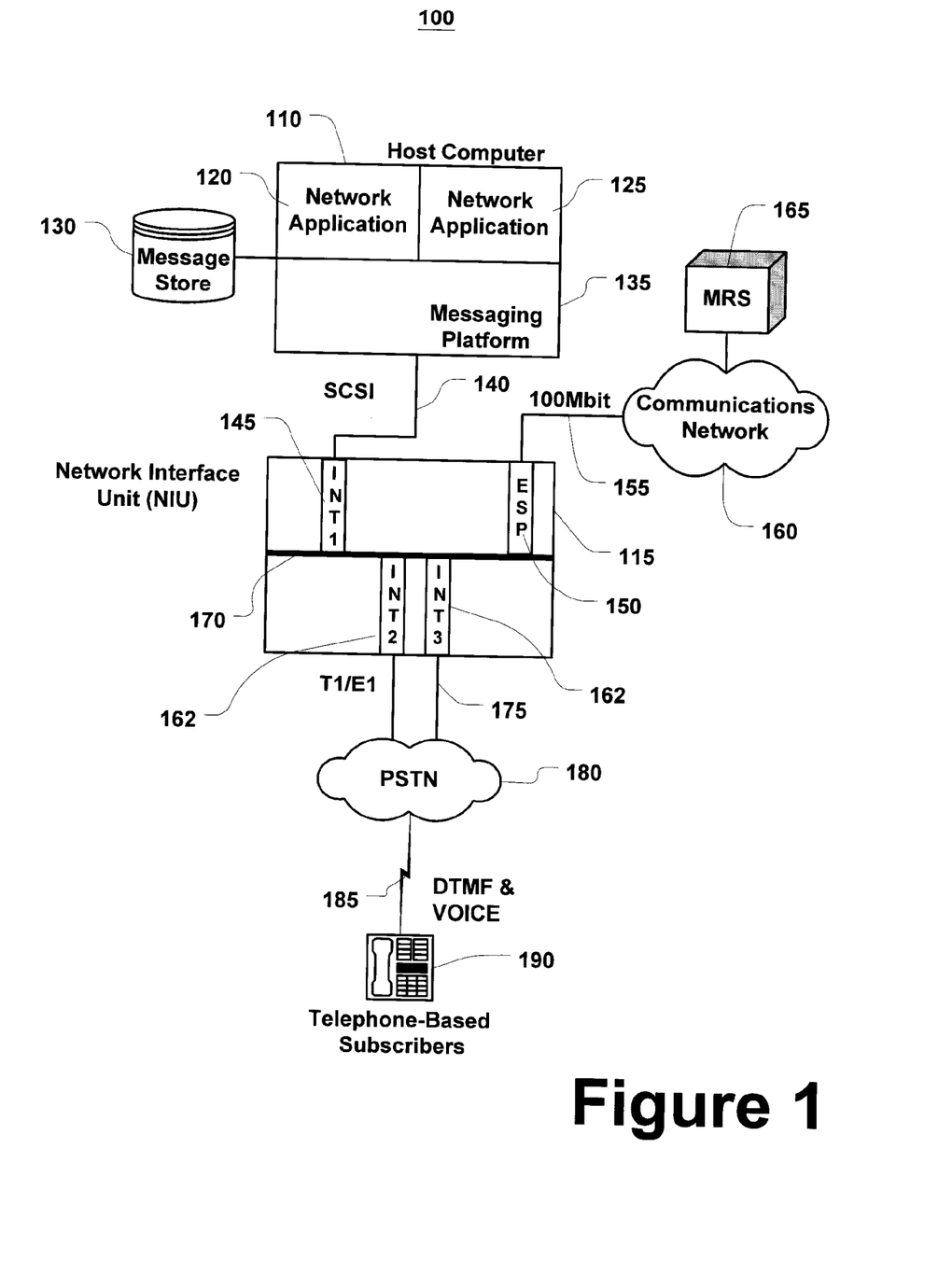
FIG. 1 is a block diagram of an exemplary messaging system.

Referring now to the drawings wherein like numerals indicate like elements throughout, there is shown in FIG. 1 a block diagram of an exemplary messaging system 100 in connection with which the present invention may be employed. Messaging system 100 comprises host computer 110 electronically coupled to network interface unit (NIU) 115. In turn, NIU 115 is electronically coupled to public switched telephone network (PSTN) 180 that supports telephone-based subscribers 190. As shown, host computer 110 comprises a messaging platform 135 that executes network applications 120 and 125, respectively. In addition, messaging platform 135 may allow network applications 120 and 125 to cooperate with message store 130. Message store 130 may be used by messaging system 100 to store data for telephone-based subscribers 190. In this example, messaging platform 135 may comprise the aforementioned Network Applications Platform (NAP) commercially available from Unisys Corporation, and the host computer 110 on which the NAP runs may comprise a selected Unisys A Series or ClearPath HMP NX computer system. It is understood, however, that the present invention is by no means limited to use with the Unisys NAP system, but rather can be employed in connection with any messaging platform that performs voice processing using one or more voice processing engines.

Still referring to FIG. 1, the NIU 115 contains a series of interfaces, interface 1 (INT1), interface 2 (INT2), and interface 3 (INT3). One interface, such as INT1, interfaces the NIU 115 to the messaging platform 135 on the host computer 110. Communication between INT1 and messaging platform 135 may, for example, be via a Small Computer Systems Interface (SCSI) bus 140. Others of the interfaces, such as INT2 and INT3 (of which there can be many), interface NIU 115 to PSTN 180. Interfaces such as INT1, INT2, and INT3 may be implemented on printed circuit boards housed within the NIU that can communicate with each other via a common bus 170, such as a bus that implements the Multibus II (IEEE 1296) open bus standard.

In this example, the NIU 115 further includes an embedded services processor (ESP) 150 that may comprise a single board computer having its own processor, memory, and operating system executing on the processor, which together provide a general purpose computing capability within the NIU 115 for executing software applications that are otherwise incapable of executing within the NIU. Additionally, the ESP 150 may further comprise a network interface for connection of the NIU 115 to other communications networks external to the messaging system, such as communications network 160.

A media resource server MRS 165 may be connected to the messaging system via communication network 160 and the network interface of the ESP 150 of the NIU 115. In this example, software executing on the host computer 110, the ESP 150, and the MRS 165, enables the ESP 150 to offload selected multi-media processing functions to the MRS 165, thereby eliminating the need for such processing functions to be performed by the voice messaging platform. For example, certain forms of voice processing may be offloaded to the MRS 165, such as, Text-to-Speech (TTS) processing, Automatic Speech Recognition (ASR) processing, and Natural Language Understanding (NLU) processing. Any number of MRS units 165 may be attached to the network 160.

Media Resource Server

Figure 2:
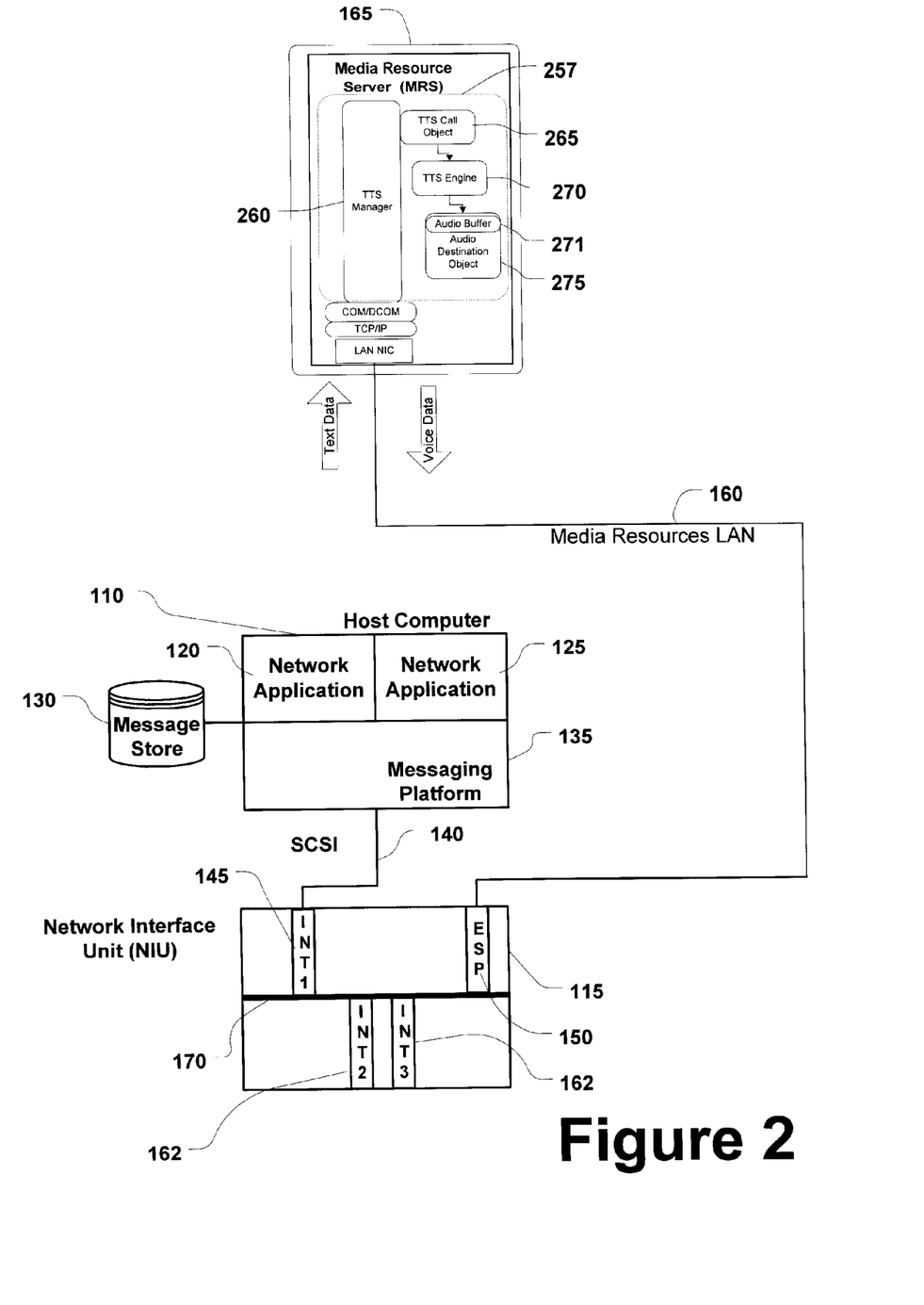
FIG. 2 is block diagram of an exemplary media resource server of the messaging system of FIG. 1.

FIG. 2 is a block diagram illustrating further details of the exemplary messaging system shown in FIG. 1. Specifically, FIG. 2 illustrates an exemplary software architecture for offloading voice processing functions to the MRS 165. In this example, TTS processing is being offloaded to MRS 165. Specifically, a TTS Manager 260 is responsible for assigning a request for TTS processing to one of the multiple TTS engines 270 on the MRS and for communicating resulting data back to the requester (e.g., ESP 150). One example of a TTS engine is the Speech Cube available from ELAN Informatique, a Lernout & Hauspie company.

When a TTS engine 270 receives a request for TTS conversion, it converts the text formatted data to speech formatted data and outputs the resulting speech data to an Audio Destination Object 275 that provides a buffer 271 for the resulting speech data. As new data is being added to the buffer 271 within the Audio Destination Object 275, the TTS manager 260 also begins to extract speech data from the buffer and to transmit the speech data back to the requester (e.g., ESP 150). As mentioned above, however, if too many TTS engines 270 are running concurrently on the MRS 165, given its processing capacity and configuration, the TTS manager 260 may encounter underflow conditions in the buffer 271 of the Audio Destination Object 275. The present invention is directed to apparatus and methods for determining how many voice processing engines (e.g., TTS engines) can run concurrently on a data processing system, such as the MRS 165, before the capacity of the system is exceeded.

The TTS Manager 260 on the MRS 165 is responsible for managing all interactions between the ESP 150 and any of the TTS Objects (e.g. TTS call object 265). When multiple MRS servers are attached to the Media Resources Local Area Network 160, the messaging system 100 may choose the least busy TTS Manager 260 among all of the cooperating MRS servers to process a given request for speech recognition processing. The ESP 150 then routes recognition parameters, audio data, and recognition results to and from the TTS Manager 260 selected to handle the particular request. In turn, the TTS Manager 260 selects the appropriate TTS Call Object 265 to process the request.

While FIG. 2 illustrates a TTS Manager 260 distributing TTS requests, other voice processing engines may be implemented on an MRS 165, or other data processing systems. For example, ASR processing may be implemented with an ASR Manager that distributes requests for ASR processing over multiple ASR engines executing on the MRS 165. Similarly, NLU processing may be implemented with an NLU Manager that distributes requests for NLU processing over multiple NLU engines executing on the MRS 165.

Figure 3:
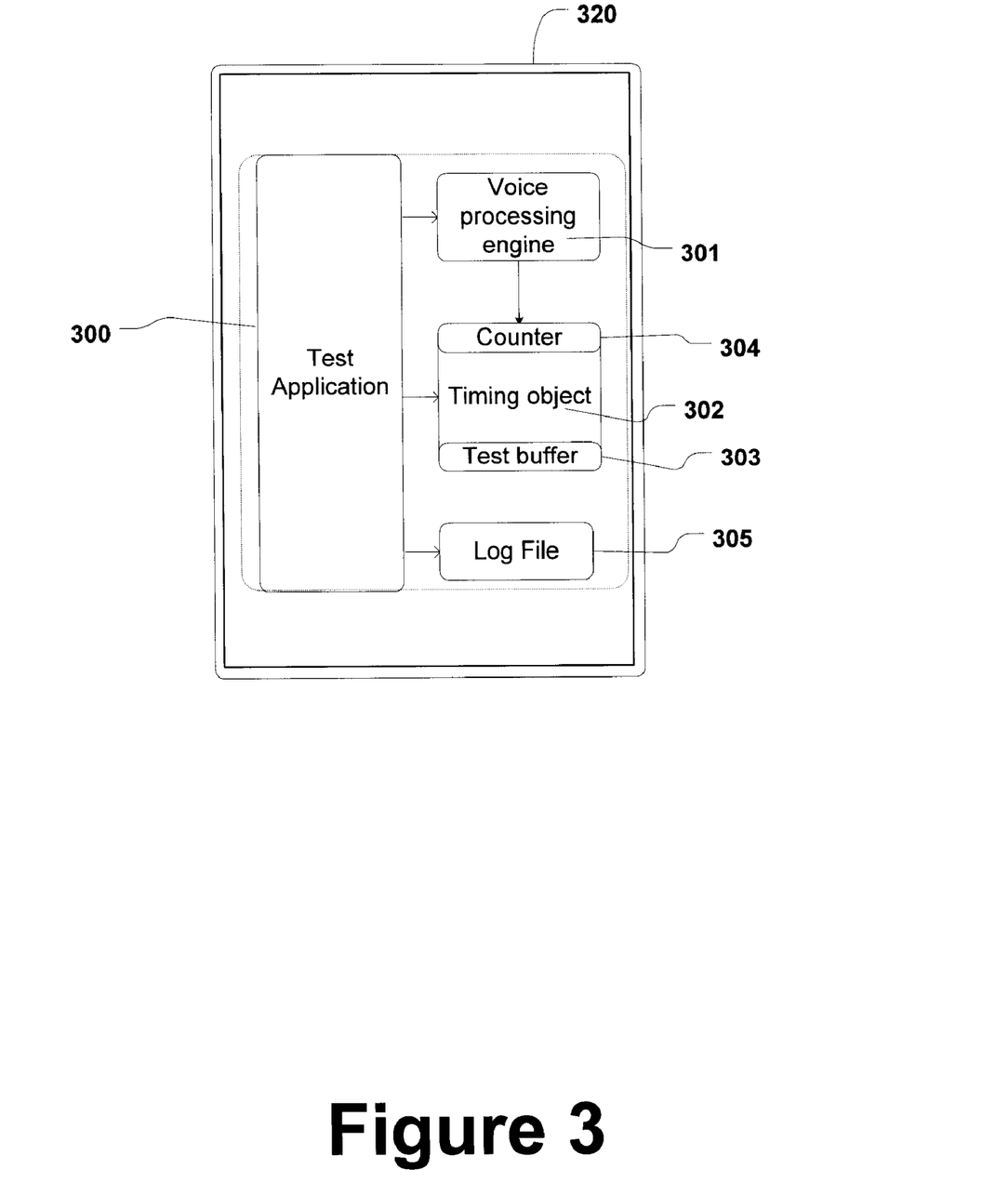
FIG. 3 is a block diagram of one embodiment of a testing system for determining the number of voice processing engines capable of support on an exemplary data processing system, in accordance with the present invention.

System and Method for Determining Number of Voice Processing Engines Capable of Support FIG. 3 is a block diagram of one embodiment of a testing system 310 for determining the number of voice processing engines 301 capable of support on an exemplary data processing system 320, in accordance with the present invention. As shown in the present embodiment, the testing system 310 comprises a test application 300, at least one voice processing engine 301, and at least one timing object 302. The voice processing engine 301 may be a TTS engine, an ASR engine, or a NLU engine. In the present embodiment, the testing system 310 is implemented to fun on a computer system or workstation running under the control of the Microsoft Windows® NT operating system. However, the present invention is by no means limited thereto, but rather can be implemented to run on any suitable computer system and under any suitable operating system.

The test application 300 allows entry of test parameters, launches voice processing engines 301, launches timing objects 302, and optionally outputs test results to a log file 305 and to a user interface (not shown).

Test application 300 includes an operator entry screen (not shown) for entering test parameters. The test parameters include an option for detecting underflow parameter, an audio buffer size parameter, a freespace notification parameter, a bookmark semantic parameter, and a wave format parameter.

The option for detecting underflow parameter determines whether the test application 300 will stop the voice processing engines 301 on an underflow condition. The audio buffer size parameter determines the size of a simulated or real buffer in the timing object. This parameter simulates an audio buffer, such as audio buffer 271, in the audio destination object 275 shown in FIG. 2. The audio buffer size parameter determines the maximum amount of data that can be held in the simulated or real buffer of the timing object 302. Once the maximum amount of data is reached, a voice processing engine, for example a TTS engine, could not increase the amount of data in the timing object 302 beyond that maximum amount.

The freespace notification parameter determines the frequency of freespace notifications. This can be used to simulate how often a true audio object/audio device would request more data from the voice processing engine 301. For example, a typical true audio destination object 275 may request data ten times a second from the voice processing engine 301. To simulate a true audio destination object, the freespace notification parameter can be set to ten times a second, for example. In this manner, the timing object 302 will request data from the voice processing engine 301 ten times per second.

The bookmark semantics parameter can be set to either immediate or delayed. In a typical true audio destination object, the audio output is delayed slightly from the output of the voice processing engine 301. The delayed setting simulates when the audio would actually be played on a true audio device, for example a speaker. This delay, which is included in most true audio devices, allows audio data to be put into an audio buffer before being output as audio, which makes timing issues less critical. Some voice processing engines do not signal the end of speech generation until they receive the final bookmark. The audio object will then detect a "false" underflow condition and generate an error. By setting this switch to "immediate" those engines can be more accurately measured.

The wave format parameter specifies which wave format the audio object will claim to support. This can be useful when testing a voice processing engine for an audio system which supports only a certain type of audio, such as Consultative Committee International Telephone and Telegraph (CCITT) MuLaw or CCITT ALaw. Some voice processing engines support these directly whereas others may require real-time conversions which cost more data processing power and reduce the total number of engines that can be supported on a platform.

Test application 300 also includes an engine parameter for selecting the particular voice processing engine(s) 301 to be tested. The test application 300 will enumerate all installed voice processing engines 301 available on the data processing system. This parameter allows selection of the voice processing engine 301. Test application 300 also includes a data parameter. If the test application 300 is a TTS engine, the data parameter may be a text string, for example. This parameter passes the TTS engine a text string for conversion to speech (or audio) format. If the test application 300 is an ASR engine, the data parameter may be an audio formatted file. This parameter passes the ASR engine an audio file for conversion to text, or some other processing.

Test application 300 includes a user interface (not shown) and optionally, a log file 305. Test application 300 may automatically log test results to the log file 305. Preferably, when the timing object 302 is running, the test application 300 determines how long it takes to generate output data and writes this information to the log file 305 after every ten attempts to output the data.

The test application 300 may terminate testing if an underflow is detected and may report the underflow in the log file 305 or optionally on the user interface. However, if underflow detection is disabled, the application will run forever or until the operator stops the test via a stop command from the user interface. Testing in this mode, while not useful for timing purposes, is useful for determining other considerations such as memory utilization and absolute maximum number of engines. Specifically, some voice processing engines have an arbitrary maximum number of engines that can run regardless of the data processing system or other system configuration conditions.

Test application 300 acts as a host for the other two components, the voice processing engine 301 and the timing object 302. Test application 300 will launch the voice processing engine 301 selected in the engine parameter. Test application 300 passes input data to the voice processing engine 301 for conversion into resulting output data. Test application 300 also launches a timing object 302 to receive resulting output data from the voice processing engine 301. Once the first amount of input data has been received by the timing object 302, the test begins. Preferably, a Microsoft Windows NT® operating system event is set which is being watched for by a timer thread. Preferably, this timer thread performs all of the timing calculations.

Voice processing engine 301 may be a TTS engine, an ASR engine, an NLU engine, or any other voice processing engine. Voice processing engine 301 processes the input data configured in the test application 300 and regularly outputs resulting data to the timing object 302 until test application 300 stops it or until there is an underflow condition or an error. For example, in the case of TTS processing, a TTS engine under test will process the input data parameter (text data) and regularly output resulting speech data to the timing object 302. Preferably, the voice processing engine regularly sends both output data and a parameter representing the amount of output data. Alternatively, the voice processing engine may send only the output data or only a parameter representing the amount of output data to the timing object 302.

Timing object 302 comprises either a counter 304 or a test buffer 303 that is utilized to detect underflow conditions and report results to the test application 300. Use of a counter 304 is presently preferred.

Preferably, timing object 302 has several states including a "standby" state, a "running" state, and a "running pending standby" state. When the system launches the timing object, it is in "standby". The voice processing engine then feeds it data and the timing object changes its state to "running". Then the voice processing engine signals the end of data and the timing object changes its state to "running pending standby" because it still has data and when it runs out of data the state changes back to "standby".

Timing object 302 receives, at intervals, output data and/or a parameter representing the amount of output data being sent from the voice processing engine.

If the timing object 302 includes a test buffer 303, the timing object puts the data received from the voice processing engine into the test buffer 303. If the timing object 302 includes a counter 304, the timing object increases the counter by the amount of data received from the voice processing engine. For example, in a TTS engine, when timing object 302 receives speech data from the TTS engine, timing object 302 increases the counter 304 by the amount of data it received. The timing object 302 may determine the amount of data from either counting the amount of data received or from reading a parameter representing the amount of data received from the voice processing engine.

Timing object 302 also "removes" data from the timing object at regular intervals determined by the freespace notification parameter. If the timing object 302 includes a test buffer 304, the timing object may actually remove data from the timing object by deleting a predetermined amount of data from the buffer. Preferably, the amount of data to be removed is determined by two of the test parameters, specifically the "freespace per second" and "wave format" parameters. From the "wave format" parameter, a "data per second" value is determined, for example, by a simple table lookup (e.g., an 8 kHz, (8 bit) MuLaw would consume 8000 bytes per second). The "data per second" is divided by "freespace per second" to yield a "data per freespace" value which is removed from the timing object during each freespace notification. For example, in the case of a "freespace per second" value of 10 and a "wave format" of 8 kHz CCITT MuLaw, the "data per freespace" would be 800 bytes.

However, if the timing object 302 includes a counter, the timing object may not actually remove data, but rather performs a calculation, simulating the removal of data, to determine the amount of data remaining in the timing object. Specifically, the counter 304 simulates the regular removal of data by decreasing the counter 304 by a predetermined amount of data at regular intervals. Counter 304 tracks how much data remains in the timing object 302 during the test, given the particular test parameters and operating conditions.

Each time the timer times out, the timing object 302 determines if there is enough data remaining in the timing object 302 to be removed. If there is enough data in the timing object 302 to be removed, the process continues normally including bookmarks being posted to the voice processing engine.

However, if there is not enough data to be removed, it is not always true that running out of data means an underflow. Another check must be made to determine if the voice processing engine has signaled the end of processing, and if it has, an underflow has not occurred and nothing is reported. For example, in a TTS engine, when the TTS engine has completed converting the text data to speech data, it signals end of speech to the timing object 302. When a voice processing engine signals end of processing, preferably, the timing object 302 returns to its "running pending standby" state. If the voice processing engine 301 has not signaled the end of processing, then an underflow has occurred. The underflow is then reported from the timing object 302 to the test application 300.

In the present embodiment, the test application 300 is written in the Microsoft Visual Basic® programming language, however, the present invention is by no means limited thereto. Rather, the test application 300 can be written in any suitable programming language and may be designed to execute on any data processing or computer platform in which it is necessary to determine the capacity of the system to handle multiple voice processing engines.

Preferably, the timing object 302 includes a main thread and a timing thread, and the underflow is reported from the timing thread to the main thread via the Win32® Application Programming Interface call "PostMessage". The main thread runs the engines, displays data, and writes to the log file. The timing thread monitors a clock, receives data at the proper time and reports underflows. The underflow condition is reported to the main thread via PostMessage because it is a quick call and the message is handled asynchronously by the main thread. This allows the timing thread to continue to watch for more underflows. In the main thread, this message is received and processed and results in a call through the event interface to the client, in this case the test application 300.

Preferably, the timing object 302 uses the Microsoft Windows NT® operating system's waitable timers created by a call to "SetWaitableTimer". The timer is set to timeout on a regular basis and simulates an actual hardware timer interrupt as would exist in a true audio device. Preferably, the timing object 302 communicates to the test application 300 through a COM event sink, this event sink exposing a single method called "UnderflowDetected". If an underflow is detected, and detection is enabled, the method implemented by the test application 300 is called.

Preferably, the timing object 302 exposes a plurality of COM interfaces. The IAudioNullObject interface provides the ability for the application to configure the test parameters. The properties exposed are DetectUnderflow, CacheSize, FreespacePerSecond, BookmarkSemantics, WaveFormat. The meaning of these properties is described above as the option for detecting underflow parameter, the audio buffer size parameter, the freespace notification parameter, the bookmark semantic parameter, and the wave format parameter, respectively.

The IPCMDestination interface allows the Speech Application Programming Interface (SAPI) to be more easily accessible from Visual Basic®. The interface, ultimately, is used to provide the actual audio object to the SAPI engine. The audio object that SAPI receives supports the IAudio and IAudioDest interfaces.

The IAudioNullObjectEvents interface is a "source" interface, which means it is not implemented by the timing object itself. Rather the client implements this interface and the timing object uses it to communicate with the client. This interface supports the UnderflowDetected method.

Figure 4:
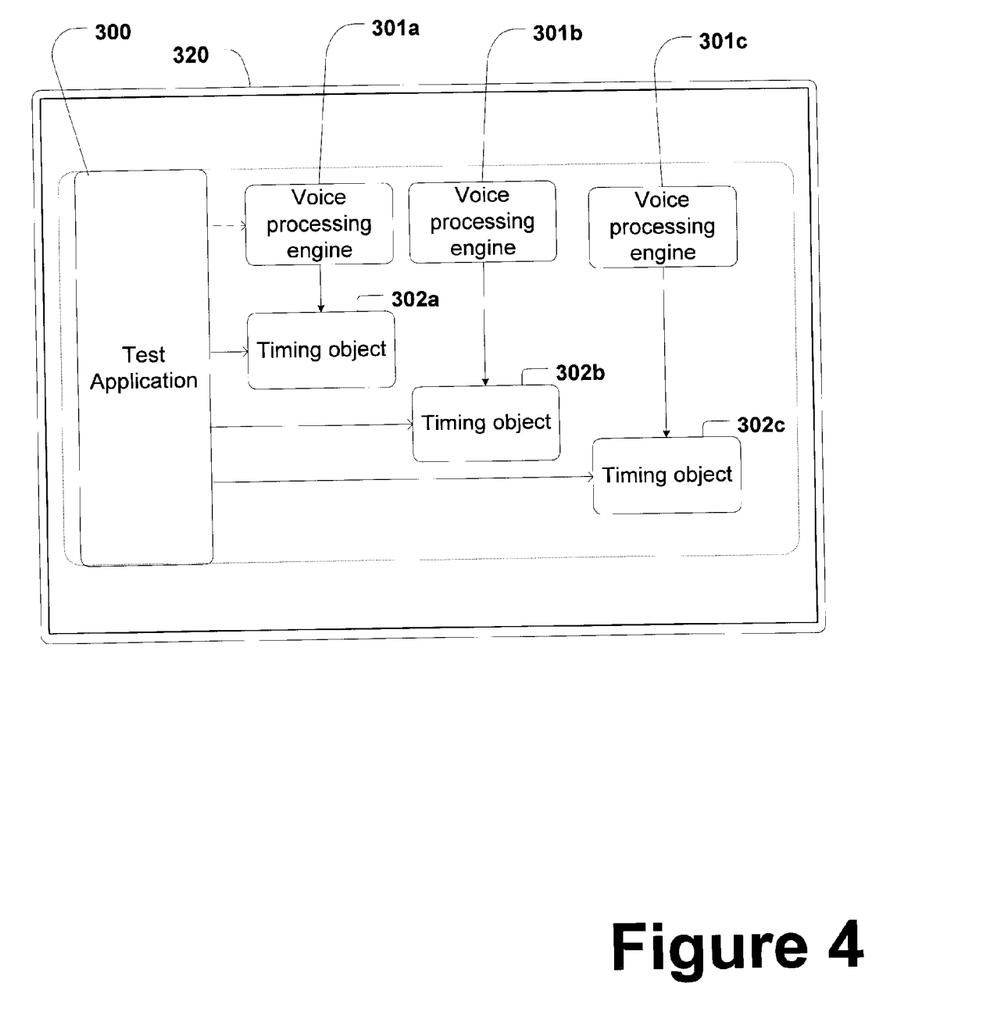
FIG. 4 is a block diagram providing further details of the system of FIG. 3.

As shown in FIG. 4, the system can be configured to automatically generate new voice processing engine 301 instances at regular intervals until an underflow condition occurs. Preferably, after ten attempts to output data, the test application 300 will launch a second voice processing engine 301b and a second timing object 302b. This process continues until both voice processing engines 301a and 301b have made ten attempts to process the data, then a third voice processing engine 301c and an associated timing object 302c, is created. Thus, a new voice processing engine 301 and a new timing object 302 will be created approximately every time all the currently running engines have each completed ten attempts to process data. This process continues until an underflow condition occurs or until the test is stopped. The number of voice processing engines 301 running when the underflow condition occurs determines the maximum number of voice processing engines 301 for the data processing system. The maximum number of voice processing engine 301 instances may be reported to both the log file 305 and the user interface (not shown) by indicating the total number of voice processing engine instances that were running when the underflow condition occurred. Preferably, ten attempts are made before launching a new voice processing engine. This is because creation of a voice processing engine, itself, causes processor activity which can temporarily destabilize the data processing system.

Figure 5:
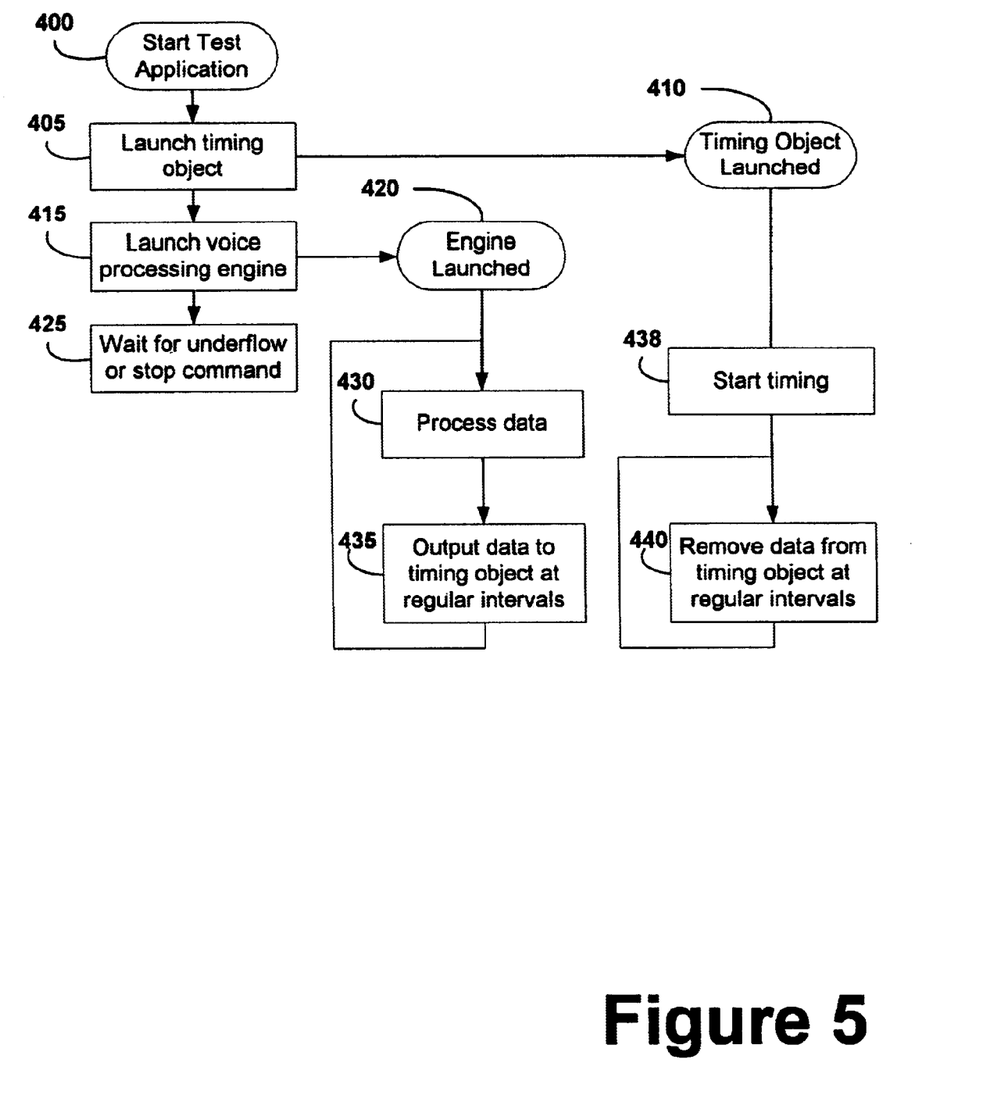
FIG. 5 is a timing diagram illustrating the operation of the system of FIGS. 3 and 4, as well as one embodiment of a method of the present invention.

FIG. 5 is a timing diagram illustrating the operation of the testing system of FIGS. 3 and 4, as well as one embodiment of a method of the present invention. As shown in FIG. 5, at step 400, the test application (e.g., element 300, shown in FIG. 3) is started.

After the proper parameters are entered, at step 405, the test application 300 launches a timing object (element 302, shown in FIG. 3). At step 410 the timing object 302 has been launched. The timing object 302 remains in a wait state (e.g., "standby" state) until it first receives data, shown at step 438. When the timing object 302 first receives data, it begins removing a predetermined amount of data from the timing object 302 at regular intervals, shown at step 440.

At step 415, the test application 300 then launches a voice processing engine instance as shown at step 420. The voice processing engine 301 processes input data (e.g., text data to a TTS engine) and outputs resulting data (e.g., speech data from a TTS engine) to the timing object 302 at regular intervals, as shown in step 430 and 435. The test application 302 continues to run until there is an underflow condition or a stop command, as shown in step 425. Preferably, test application 302 is configured to launch multiple instances of voice processing engines 301.

Figure 6:
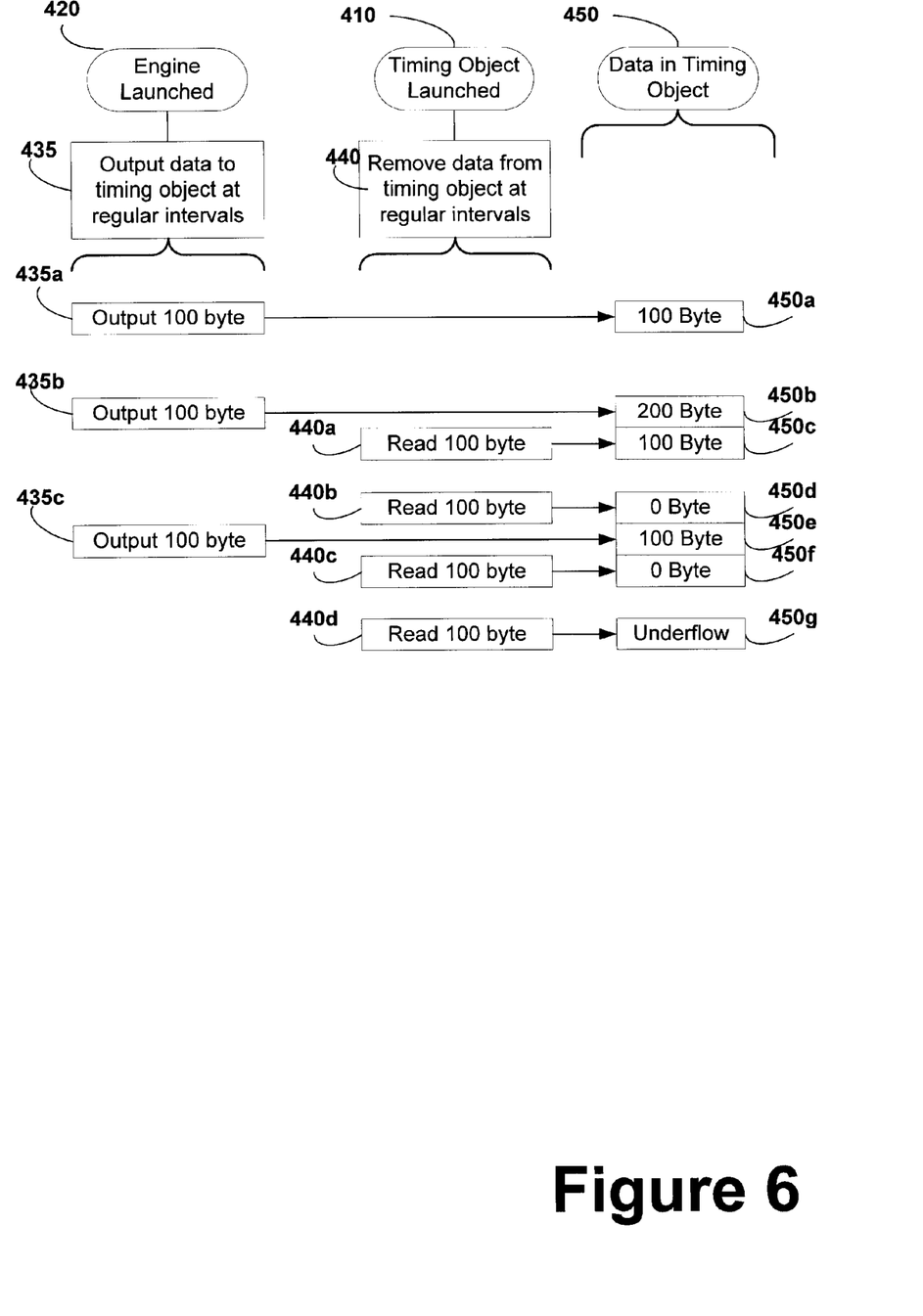
FIG. 6 is another timing diagram illustrating further details of the operation of the system and method of the present invention.

FIG. 6 is another timing diagram illustrating further details of the operation of the system and method of the present invention. In the embodiment shown in the Figure, it is assumed that the voice processing engine 301 is a TTS engine. As shown in FIG. 6, voice processing engine 301 processes input data and outputs resulting data to the timing object 302 at regular intervals, as shown in step 435. At step 440, the timing object 302 begins simulating removal of the data from the timing object 302 at regular intervals. When the timing object 302 attempts to remove data and there is not enough data, an underflow has occurred, unless the voice processing engine has signaled end of processing.

At time 435a, TTS engine outputs 100 bytes of speech data to the timing object 302, which now has 100 bytes of speech data, shown at time 450a. At time 435b, TTS engine outputs 100 more bytes of speech data to the timing object 302, which increases the total speech data within the timing object 302 to 200 bytes, shown at time 450b. At time 440a, timing object 302 removes 100 bytes of speech data leaving 100 bytes, shown at 450c. At time 440b, timing object 302 removes 100 more bytes of speech data leaving 0 bytes, shown at time 450d. At time 435c, TTS engine outputs 100 more bytes of speech data to the timing object 302, which increases the total speech data within the timing object 302 to 100 bytes, shown at time 450e. At time 440c, timing object 302 removes 100 bytes of speech data, leaving 0 bytes of speech data, shown at time 450f. At time 440d, timing object 302 attempts to remove 100 more bytes of speech data. Since there are no bytes of speech data in the timing object 302 when it is requesting data, an underflow has occurred, shown at time 450g, unless the TTS engine has signaled end of speech.

The present invention may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular structures, methods, materials, and embodiments, the invention is not intended to be limited to the particulars disclosed herein; rather, the invention extends to all structures, methods and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed is:

1. A system for determining the capacity of a data processing system to run voice processing engines comprising:
    a test application adapted to launch on the data processing system at least one voice processing engine; and
    a timing object, into which said at least one voice processing engine outputs data, said timing object being further adapted to simulate removal of a predetermined amount of data from said timing object at regular intervals and to report to the test application a detected underflow if one of either an amount of data remaining in the timing object or a parameter representative of an amount of data remaining in the timing object is less than a predetermined amount.

2. The system of claim 1, wherein the test application successively launches additional voice processing engines until an underflow caused by any one of the voice processing engines is detected, whereby the capacity of the data processing system to run multiple voice processing engines is determined.

3. The system of claim 1 wherein said timing object includes a test buffer for determining the amount of data in the timing object.

4. The system of claim 1 wherein said timing object includes a counter for determining the amount of data in the timing object.

5. The system of claim 1 wherein said at least one voice processing engine is a text to speech engine.

6. The system of claim 1 wherein said at least one voice processing engine is an automated speech recognition engine.

7. The system of claim 1 wherein said at least one voice processing engine is a natural language understanding engine.

8. The system of claim 1 wherein said test application is further adapted to configure test parameters.

9. The system of claim 8 wherein said test parameters comprises an audio buffer size parameter.

10. The system of claim 8 wherein said test parameters comprises a freespace notification parameter.

11. The system of claim 8 wherein said test parameters comprises a bookmark semantic parameter.

12. The system of claim 8 wherein said test parameters comprises a wave format parameter.

13. The system of claim 1 wherein said test application is adapted to create a log file for reporting test results.

14. The system of claim 13 wherein said timing object is adapted to regularly report results to said test application.

15. A method of determining the capacity of a data processing system to run voice processing engines comprising:
    receiving one of either data and a parameter representing an amount of data into a timing object;
    simulating removal of data from the timing object at regular intervals; and
    detecting an underflow condition by determining if one of an amount of data remaining in the timing object and a parameter representing an amount of data remaining in the timing object is less than a predetermined amount.

16. The method of claim 15 further comprising configuring a test application with test parameters.

17. The method of claim 15 further comprising launching a voice processing engine from the test application.

18. The method of claim 15 further comprising launching a timing object from the test application.

19. The method of claim 15 further comprising reporting a underflow condition.

20. The method of claim 15 wherein detecting an underflow condition comprises determining if an amount of data in the timing object is less than a predetermined amount of data to be removed and the voice processing engine has not signaled end of processing.

21. The method of claim 15 wherein detecting an underflow condition comprises determining if an amount of data in a test buffer in the timing object is less than a predetermined amount of data to be removed and the voice processing engine has not signaled end of processing.

22. The method of claim 15 wherein detecting an underflow condition comprises determining if an amount of data in a counter in the timing object is less than a predetermined amount of data to be removed and the voice processing engine has not signaled end of processing.

23. The method of claim 16 wherein configuring a test application with test parameters comprises configure a test application with an audio buffer size parameter.

24. The method of claim 16 wherein configuring a test application with test parameters comprises configure a test application with a freespace notification parameter.

25. The method of claim 16 wherein configuring a test application with test parameters comprises configure a test application with a bookmark semantic parameter.

26. The method of claim 16 wherein configuring a test application with test parameters comprises configure a test application with a wave format parameter.

27. The method of claim 17 wherein launching a voice processing engine from the test application comprises launching multiple voice processing engines from the test application.

28. The method of claim 17 wherein launching a voice processing engine from the test application comprises consecutively launching multiple voice processing engines from the test application at regular intervals.

29. The method of claim 17 wherein launching a voice processing engine from the test application comprises launching a text to speech engine from the test application.

30. The method of claim 17 wherein launching a voice processing engine from the test application comprises launching a automated speech recognition engine from the test application.

31. The method of claim 17 wherein launching a voice processing engine from the test application comprises launching a natural language understanding engine from the test application.

32. A computer-readable medium having computer-executable modules/components for determining the capacity of a data processing system to run multiple voice mail processing engines comprising:
   a test application for launching at least one voice processing engine; and
   a timing object for determining an underflow condition by determining if one of an amount of data remaining in the timing object and a parameter representing an amount of data remaining in the timing object is less than a predetermined amount.

33. The computer-readable medium having computer-executable modules/components of claim 32 wherein said test application successively launches additional voice processing engines until an underflow caused by any one of the voice processing engines is detected, whereby the capacity of the data processing system to run multiple voice processing engines is determined.

34. The computer-readable medium having computer-executable modules/components of claim 32 wherein said timing object includes a test buffer for determining the amount of data in the timing object.

35. The computer-readable medium having computer-executable modules/components of claim 32 wherein said timing object includes a counter for determining the amount of data in the timing object.

36. The computer-readable medium having computer-executable modules/components of claim 32 wherein said at least one voice processing engine is a text to speech engine.

37. The computer-readable medium having computer-executable modules/components of claim 32 wherein said at least one voice processing engine is an automated speech recognition engine.

38. The computer-readable medium having computer-executable modules/components of claim 32 wherein said at least one voice processing engine is a natural language understanding engine.

39. The computer-readable medium having computer-executable modules/components of claim 32 wherein said test application is further adapted to configure test parameters.

40. The computer-readable medium having computer-executable modules/components of claim 39 wherein said test parameters comprises an audio buffer size parameter.

41. The computer-readable medium having computer-executable modules/components of claim 39 wherein said test parameters comprises a freespace notification parameter.

42. The computer-readable medium having computer-executable modules/components of claim 39 wherein said test parameters comprises a bookmark semantic parameter.

43. The computer-readable medium having computer-executable modules/components of claim 39 wherein said test parameters comprises a wave format parameter.

44. The computer-readable medium having computer-executable modules/components of claim 32 wherein said test application creates a log file for reporting test results.

45. The computer-readable medium having computer-executable modules/components of claim 44 wherein said timing object is adapted to regularly report results to said test application.

46. A computer-readable medium having instructions stored thereon for determining the capacity of a data processing system to run voice processing engines, the instructions, when executed on the data processing system, causing the data processing system to perform the following:
   receiving one of either data and a parameter representing an amount of data into a timing object;
   simulating removal of a predetermined amount of data from the timing object at regular intervals; and
   detecting an underflow condition if one of an amount of data remaining in the timing object and a parameter representing an amount of data remaining in the timing object is less than a predetermined amount.

47. The computer-readable medium of claim 46 further comprising configuring a test application with test parameters.

48. The computer-readable medium of claim 46 further comprising launching a voice processing engine from the test application.

49. The computer-readable medium of claim 46 further comprising launching a timing object from the test application.

50. The computer-readable medium of claim 46 further comprising reporting an underflow condition.

51. The computer-readable medium of claim 46 wherein detecting an underflow condition comprises determining if an amount of data in the timing object is less than a predetermined amount of data to be removed and the voice processing engine has not signaled end of processing.

52. The computer-readable medium of claim 46 wherein detecting an underflow condition comprises determining if an amount of data in a test buffer in the timing object is less than a predetermined amount of data to be removed and the voice processing engine has not signaled end of processing.

53. The computer-readable medium of claim 46 wherein detecting an underflow condition comprises determining if an amount of data in a counter in the timing object is less than a predetermined amount of data to be removed and the voice processing engine has not signaled end of processing.

54. The computer-readable medium of claim 47 wherein configuring a test application with test parameters comprises configure a test application with an audio buffer size parameter.

55. The computer-readable medium of claim 47 wherein configuring a test application with test parameters comprises configure a test application with a freespace notification parameter.

56. The computer-readable medium of claim 47 wherein configuring a test application with test parameters comprises configure a test application with a bookmark semantic parameter.

57. The computer-readable medium of claim 47 wherein configuring a test application with test parameters comprises configure a test application with a wave format parameter.

58. The computer-readable medium of claim 48 wherein launching a voice processing engine from the test application comprises launching multiple voice processing engines from the test application.

59. The computer-readable medium of claim 48 wherein launching a voice processing engine from the test application comprises consecutively launching multiple voice processing engines from the test application at regular intervals.

60. The computer-readable medium of claim 48 wherein launching a voice processing engine from the test application comprises launching a text to speech engine from the test application.

61. The computer-readable medium of claim 48 wherein launching a voice processing engine from the test application comprises launching an automated speech recognition engine from the test application.

62. The computer-readable medium of claim 48 wherein launching a voice processing engine from the test application comprises launching a natural language understanding engine from the test application.

* * * * *